United States Patent
Kim et al.

(10) Patent No.: US 11,220,566 B2
(45) Date of Patent: Jan. 11, 2022

(54) CATALYST COMPOSITION FOR PREPARING ELASTIC COPOLYMER, AND METHOD FOR PREPARING ELASTIC COPOLYMER, WHICH COMPRISES ETHYLENE AND ALPHA-OLEFIN OR ETHYLENE, ALPHA-OLEFIN AND UNCONJUGATED DIENE, BY USING SAME

(71) Applicant: KUMHO POLYCHEM CO., LTD., Seoul (KR)

(72) Inventors: Hag-Jun Kim, Sejong-si (KR); Hyun-Soo Kim, Yeosu-Si (KR); Sung Kwan Kim, Sejong-si (KR); Sungwoo Yoon, Sejong-si (KR); Hee Ryoung Koo, Daejeon (KR); Aujiru Son, Daejeon (KR)

(73) Assignee: KUMHO POLYCHEM CO., LTD., Seoul (KR)

( * ) Notice: Subject to any disclaimer, the term of this patent is extended or adjusted under 35 U.S.C. 154(b) by 0 days.

(21) Appl. No.: 16/635,522

(22) PCT Filed: Nov. 15, 2018

(86) PCT No.: PCT/KR2018/013996
§ 371 (c)(1),
(2) Date: Jan. 30, 2020

(87) PCT Pub. No.: WO2019/098703
PCT Pub. Date: May 23, 2019

(65) Prior Publication Data
US 2020/0270382 A1 Aug. 27, 2020

(30) Foreign Application Priority Data

Nov. 15, 2017 (KR) ........................ 10-2017-0152259
Jan. 12, 2018 (KR) ........................ 10-2018-0004375

(51) Int. Cl.
  *C08F 4/6592* (2006.01)
  *C08F 210/16* (2006.01)
  *C07F 17/00* (2006.01)
(52) U.S. Cl.
  CPC ............ *C08F 210/16* (2013.01); *C07F 17/00* (2013.01)
(58) Field of Classification Search
  CPC .............................. C08F 4/6592; C08F 210/16
  See application file for complete search history.

(56) References Cited

U.S. PATENT DOCUMENTS

| | | |
|---|---|---|
| 5,229,478 A | 7/1993 | Floyd et al. |
| 5,442,020 A | 8/1995 | Davis |
| 5,627,117 A | 5/1997 | Mukaiyama et al. |
| 6,010,974 A | 1/2000 | Kim et al. |
| 6,153,776 A | 11/2000 | Patton et al. |
| 6,228,790 B1 | 5/2001 | Ting et al. |
| 6,262,197 B1 * | 7/2001 | Aulbach ................ C07F 17/00 526/127 |
| 6,545,088 B1 | 4/2003 | Kolthammer et al. |
| 2004/0072677 A1 | 4/2004 | Lee et al. |

FOREIGN PATENT DOCUMENTS

| | | |
|---|---|---|
| KR | 10-2001-0041560 A | 5/2001 |
| KR | 10-2001-0072229 A | 7/2001 |
| KR | 10-2012-0010030 A | 2/2012 |
| KR | 10-2015-0084733 A | 7/2015 |
| KR | 10-2017-0075365 A | 7/2017 |

OTHER PUBLICATIONS

International Search Report of corresponding PCT Application No. PCT/KR2018/013996—6 pages (dated Feb. 13, 2019).
Lee et al., "A biphenylene-bridged dinuclear constrained geometry titanium complex for ethylene and ethylene/1-octene polymerizations", Journal of Organometallic Chemistry, vol. 696—7 pages (2012).

\* cited by examiner

*Primary Examiner* — Caixia Lu
(74) *Attorney, Agent, or Firm* — Knobbe Martens Olson & Bear LLP

(57) ABSTRACT

The present invention relates to a method for preparing an ethylene-based elastic copolymer, and more particularly, to a method for preparing an ethylene-based elastic copolymer by using a catalyst composition for preparing an ethylene-based elastic copolymer, the catalyst composition comprising a binuclear constrained geometry transition metal compound, as a main catalyst, having a structural advantage to obtain a high-molecular-weight ethylene-based elastic copolymer due to a high polymerization activity and comonomer reactivity because the binuclear constrained geometry transition metal compound has a structure in which cyclopentadiene ligands of two constrained geometry catalysts are linked by 1,4-phenylene, and one or more cocatalyst compounds selected from the group consisting of an organoaluminum compound, an organoaluminoxane compound, and a boron compound.

5 Claims, No Drawings

CATALYST COMPOSITION FOR PREPARING ELASTIC COPOLYMER, AND METHOD FOR PREPARING ELASTIC COPOLYMER, WHICH COMPRISES ETHYLENE AND ALPHA-OLEFIN OR ETHYLENE, ALPHA-OLEFIN AND UNCONJUGATED DIENE, BY USING SAME

TECHNICAL FIELD

The present invention relates to a method for preparing an ethylene-based elastic copolymer by using a catalyst composition for preparing an ethylene-based elastic copolymer, and more particularly, to a method for preparing an ethylene-based elastic copolymer by using a catalyst composition for preparing an elastic copolymer, the catalyst composition comprising a binuclear constrained geometry transition metal compound, as a main catalyst, having a structural advantage to obtain a high-molecular-weight ethylene-based elastic copolymer due to a high polymerization activity and comonomer reactivity because the binuclear constrained geometry transition metal compound has a structure in which cyclopentadiene ligands of two constrained geometry catalysts are linked by 1,4-phenylene, and one or more cocatalyst compounds selected from the group consisting of an organoaluminum compound, an organoaluminoxane compound, and a boron compound.

BACKGROUND ART

An ethylene-based elastic copolymer, which is a so-called copolymer of ethylene and α-olefin (EPM) or a terpolymer of ethylene, α-olefin, and diene (EPDM), is molded in a rubber product through a curing process using peroxide or a sulfur compound, and may be used for a variety of uses. Such an ethylene-based elastic copolymer has an excellent weathering resistance and chemical resistance, and thus is used for a sealing agent for a roof or a vehicle in a wide temperature range, an internal component of an engine compartment, and a plastic blend for impact resistance. In addition, the ethylene-based elastic copolymer has excellent electric insulating properties, and thus is used for a wire or a cable.

An ethylene-based elastic elastomer, a copolymer of ethylene and α-olefin (EPM), or a terpolymer of ethylene, α-olefin, and diene (EPDM) has been prepared mainly using a solution process in which a homogeneous Ziegler-Natta catalyst containing a vanadium compound and organoaluminum is used. However, in a case of using such a catalyst, a content of a residual catalyst in a polymer is high due to a low catalyst activity and a solvent recovering process by addition of an excessive amount of catalyst removal water and steam stripping is thus required, such that a large amount of energy is required to remove heat of reaction due to a low polymerization temperature, and a cost-effective process cannot thus be implemented. In addition, it is difficult to adjust a reaction due to a low reactivity between α-olefin and diene which are comonomers and a gelation reaction that easily occurs due to a large amount of residual halogen.

A metallocene catalyst developed after the mid-1990s has been widely used for preparing an olefin polymer because a high activity is obtained and a molecular weight and a molecular weight distribution are easily adjusted in a polymerization of olefin. In particular, the metallocene catalyst has excellent copolymerization properties with an olefin-based comonomer, and studies on a preparation of various olefin-based elastic copolymers have thus been conducted.

As an example, U.S. Pat. No. 5,229,478 discloses a preparation of a copolymer of ethylene, propylene, and diene (EPDM) having a high molecular weight by using an ansa-metallocene catalyst. In addition, U.S. Pat. No. 6,545,088 discloses a process for preparing an ethylene-based copolymer by using a constrained geometry monocyclopentadienyl ansa-metallocene catalyst.

In a case of using the constrained geometry catalyst, a comonomer such as α-olefin or diene easily approaches the vicinity of a catalytic active site at which steric hindrance is reduced. Therefore, the constrained geometry catalyst is known as a catalyst suitable for preparing an elastic copolymer of ethylene and α-olefin or ethylene, α-olefin, and diene. When the ethylene-based elastic copolymer is prepared by using such a constrained geometry metallocene catalyst, a copolymer may be easily prepared in various compositions, and a process in which a comonomer conversion is high may be implemented. In addition, since a catalyst removal process may be omitted due to a high catalyst activity, a high cost-effective solution process may be implemented. However, in the case of such a catalyst, when a copolymer having a high content of a comonomer is prepared, a molecular weight thereof is decreased and it is difficult to adjust physical properties and processability thereof due to a narrow molecular weight distribution. Accordingly, such a polymer is limited in the replacement of an elastic copolymer of ethylene and α-olefin or ethylene, α-olefin, and diene, which is prepared by using a Ziegler-Natta catalyst.

A new approach to solve the above problems is to use a binuclear metallocene catalyst having two core metals in one catalyst molecule. In this case, it is possible to adjust a molecular weight distribution or physical property distribution by changing a form of an active site depending on the type of core metal.

As an example, U.S. Pat. Nos. 5,442,020, 5,627,117, 6,010,974, and 6,153,776 disclose a binuclear group IV transition metal metallocene catalyst linked by a flexible bridge structure such as alkylene or silylene, and a method for preparing an ethylene-based elastic copolymer using the same. In addition, examples of a binuclear metallocene catalyst linked by a rigid biphenylene group, and ethylene compolymerization are disclosed in U.S. Pat. No. 6,943,225.

An example of a preparation of an elastic copolymer of ethylene and α-olefin or ethylene, α-olefin, and diene (EPM or EPDM) by using a binuclear constrained geometry catalyst is disclosed in U.S. Pat. No. 6,228,790. It is reported that this catalyst has a structure in which two core metals are linked by a bis-amide group and EPM or EPDM having a high Mooney viscosity and a broad molecular weight distribution may be prepared by using this catalyst. However, practically, this catalyst has disadvantages in that it is difficult to improve physical properties and processability and a diene conversion when preparing EPDM is low. In particular, in a case of a binuclear constrained geometry catalyst, it is known that stability, activity, and reactivity of the catalyst are affected depending on a position or structure of a linked bridge (Chem. Rev. 2011, 111, 2450). The binuclear constrained geometry catalyst has a structure in which steric hindrance between two catalyst molecules is induced due to a linkage of the two catalyst molecules by an amide group around a core metal and an electronic interaction between core metals is unlikely to be carried out.

As another example, Korean Patent Laid-Open Publication No. 2015-0084733 discloses a method for preparing an elastic copolymer of ethylene and α-olefin or ethylene, α-olefin, and diene (EPM or EPDM) by using a binuclear constrained geometry catalyst having a structure in which two cyclopentadiene ligands are linked by a bridge structure in which two arylene groups are linked through alkylene or a hetero atom. In Korean Patent Laid-Open Publication No. 2015-0084733, it is claimed that in a case of using such a binuclear catalyst, an activity and a molecular weight may be improved by an electronic interaction through a bridge bonding of a conjugated structure. However, in this case, an effect in increasing activity by the electronic interaction is not clear, and there is still a demand for a cost-effective catalyst that has a high activity at a higher temperature, can adjust various physical properties, and is easily synthesized.

DISCLOSURE

Technical Problem

In order to solve the conventional problems described above, as a result of extensive studies, the inventors of the present invention found that when a binuclear catalyst having a structure in which cyclopentadiene ligands of two constrained geometry catalysts are linked by 1,4-phenylene is used as a main catalyst in a preparation of an ethylene-based elastic copolymer, a catalytic active site is stabilized due to a maximized electronic interaction by 1,4-phenylene having a conjugated structure with a short bridge bonding, and a high polymerization activity and molecular weight are exhibited at a high polymerization temperature of 100° C. or higher due to a limited steric hindrance between molecules in a binuclear constrained geometry transition metal catalyst, thereby completing the present invention.

An object of the present invention is to provide, in a commercial point of view, a cost-effective method for preparing an ethylene-based elastic copolymer by using a catalyst composition for preparing an ethylene-based elastic copolymer, the catalyst compound comprising a binuclear constrained geometry transition metal compound having a structure in which cyclopentadiene ligands of two constrained geometry catalysts are linked by 1,4-phenylene, and one or more cocatalyst compounds selected from the group consisting of an organoaluminum compound, an organoaluminoxane compound, and a boron compound.

Technical Solution

In one general aspect, there is provided a method for preparing an ethylene-based elastic copolymer by using a catalyst composition for preparing an ethylene-based elastic copolymer, the catalyst composition comprising a binuclear constrained geometry transition metal compound represented by the following Formula 1; and one or more cocatalyst compounds selected from the group consisting of an organoaluminum compound, an organoaluminoxane compound, and a boron compound.

More specifically, there is provided, in a commercial point of view, a cost-effective method for preparing an ethylene-based elastic copolymer by copolymerizing ethylene, α-olefin, and C4-C30 diene in the presence of a binuclear constrained geometry transition metal catalyst composition for preparing an elastic copolymer, the binuclear constrained geometry transition metal catalyst composition comprising a binuclear constrained geometry transition metal compound represented by Formula 1, as a main catalyst, having a structural advantage to obtain a high-molecular-weight ethylene-based elastic copolymer due to a high polymerization activity and comonomer reactivity because the binuclear constrained geometry transition metal compound has a structure in which cyclopentadiene ligands of two constrained geometry catalysts are linked by 1,4-phenylene, and one or more cocatalyst compounds selected from the group consisting of an organoaluminum compound, an organoaluminoxane compound, and a boron compound.

In another general aspect, there is provided a method for preparing an ethylene-based elastic copolymer by using a binuclear constrained geometry transition metal catalyst composition for preparing an ethylene-based elastic copolymer, the binuclear constrained geometry transition metal catalyst composition comprising a binuclear constrained geometry transition metal compound represented by the following Formula 1; and one or more cocatalyst compounds selected from the group consisting of an organoaluminum compound, an organoaluminoxane compound, and a boron compound, wherein the ethylene-based elastic copolymer is a copolymer of ethylene, α-olefin, and C4-C30 diene, the α-olefin is propylene, a polymerization temperature is in a range of 100 to 200° C., an ethylene conversion is 60 to 80%, a propylene conversion is 40 to 50%, and a content of the propylene in the ethylene-based elastic copolymer is 40 to 70 wt %.

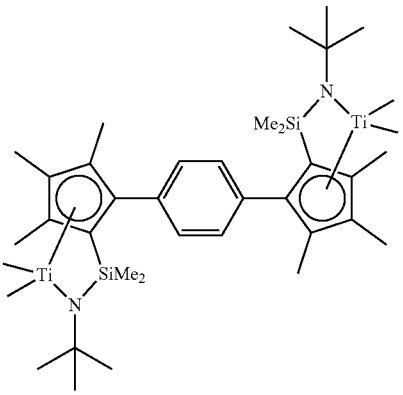

[Formula 1]

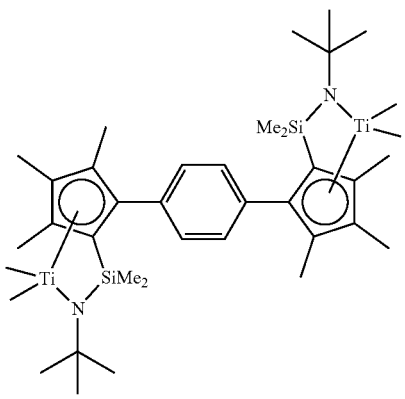

[Formula 1]

Advantageous Effects

The ethylene-based elastic copolymer may be easily and cost-effectively prepared at a high synthesis yield by using a catalyst composition for preparing an ethylene-based elastic copolymer according to the present invention, the catalyst composition comprising a binuclear constrained geometry transition metal compound, as a main catalyst, having a structure in which cyclopentadiene ligands of two constrained geometry catalysts are linked by 1,4-phenylene.

Further, the binuclear constrained geometry transition metal compound used as a main catalyst in the present invention has a structure in which cyclopentadiene ligands of two a constrained geometry catalysts are linked by 1,4-phenylene, such that a solubility to an aliphatic hydrocarbon solvent is excellent, whereby a uniform concentration of the catalyst may be maintained during a polymerization reaction, and the catalyst may be easily added. Therefore, a stable polymerization activity may be expected.

Further, the binuclear constrained geometry transition metal compound used as a main catalyst in the preparation method of the present invention has a structure in which cyclopentadiene ligands of two constrained geometry catalysts are linked by 1,4-phenylene, such that a catalytic active site is stabilized due to a maximized electronic interaction by 1,4-phenylene having a conjugated structure in which short bridges are bonded, a high catalyst activity is maintained even at a high temperature due to an excellent thermal stability of the catalyst by a limited steric hindrance effect between molecules in a binuclear constrained geometry transition metal catalyst, and a high-molecular-weight copolymer may be prepared at a high yield due to a high comonomer conversion and an excellent reaction efficiency by an excellent copolymerization reactivity with other olefins, in particular, an elastic copolymer of ethylene, α-olefin, and diene (EPDM) having a high polymerization activity, an excellent comonomer polymerization performance, and a high molecular weight at a high polymerization temperature of 100° C. or higher.

Accordingly, the preparation method according to the present invention may be efficiently used for preparing an elastic copolymer of ethylene, α-olefin, and diene (EPDM) having various physical properties.

BEST MODE

Hereinafter, the present invention will be described in more detail.

A method for preparing an ethylene-based elastic copolymer by an embodiment of the present invention is performed by polymerizing ethylene, α-olefin, and C4-C30 diene in the presence of a binuclear constrained geometry transition metal catalyst composition for preparing an ethylene-based elastic copolymer, the binuclear constrained geometry transition metal catalyst composition comprising a binuclear constrained geometry transition metal compound represented by the following Formula 1 and having a structure in which cyclopentadiene ligands of two constrained geometry catalysts are linked by 1,4-phenylene, and one or more cocatalyst compounds selected from the group consisting of an organoaluminum compound, an organoaluminoxane compound, and a boron compound.

[Formula 1]

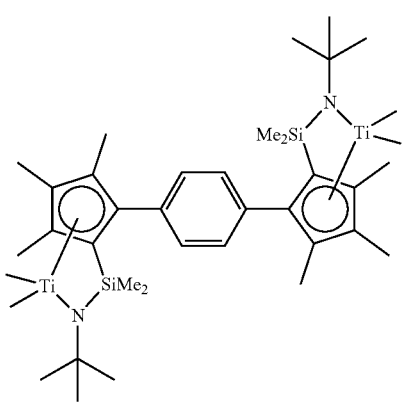

The binuclear constrained geometry transition metal compound represented by Formula 1 may provide a catalyst structure that is advantageous in terms of catalyst stability and formation of a high molecular weight as compared to a conventional transition metal catalyst, that is, a transition metal catalyst formed of a single molecule and a binuclear constrained geometry catalyst in which two arylenes are linked through alkylene or a hetero atom in a bridge structure, such that an ethylene-based elastic copolymer of ethylene, α-olefin, and diene (EPDM) having a high polymerization activity, an excellent comonomer polymerization performance, and a high molecular weight at a high polymerization temperature of 100° C. or higher may be prepared.

In an embodiment of the present invention, in order to be an active catalyst component used in an olefin polymerization, the binuclear constrained geometry transition metal compound may be employed together with, as a cocatalyst, one or more selected from the group consisting of an organoaluminum compound, an organoaluminoxane compound, and a boron compound, which preferably can extract two methyl ligands bonded to transition metal titanium from the binuclear constrained geometry transition metal compound to cationize the core metal and act as a counterion having a weak bond strength, that is, an anion. The organoaluminum compound used in this case may act to remove trace polar materials acting as catalytic poison.

In an embodiment of the present invention, the organoaluminum compound is represented by the following Formula A.

[Formula A]

In Formula A, $R^a$ is C1-C10 alkyl, and $R^b$ and $R^c$ are each independently C1-C10 alkyl, C1-C10 alkoxy, or halogen.

In an embodiment of the present invention, specific examples of the organoaluminum compound include trialkyl aluminum such as trimethylaluminum, triethylaluminum, tripropylaluminum, triisobutylaluminum, tributylaluminum, trihexylaluminum, trioctylaluminum, or tridecylaluminum; dialkyl aluminum alkoxide such as dimethylaluminum methoxide, diethylaluminum methoxide, or dibutylaluminum methoxide; dialkyl aluminum halide such as dimethylaluminum chloride, diethylaluminum chloride, dipropylaluminum chloride, diisobutylaluminum chloride, dibutylaluminum chloride, or dihexylaluminum chloride; alkyl aluminum dialkoxide such as methylaluminum dimethoxide, ethylaluminum dimethoxide, or butylaluminum dimethoxide; and alkyl aluminum dihalide such as methylaluminum dichloride, ethylaluminum dichloride, propylaluminum dichloride, isobutylaluminum dichloride, butylaluminum dichloride, or hexylaluminum dichloride, and the organoaluminum compound is preferably trialkyl aluminum and more preferably triisobutylaluminum.

In an embodiment of the present invention, the organoaluminoxane compound is represented by the following Formula B and may have a linear, cyclic, or network structure.

[Formula B]

In Formula B, $R^d$ is C1-C10 alkyl, and x is an integer of 1 to 70.

In an embodiment of the present invention, specific examples of the organoaluminoxane compound include methylaluminoxane, ethylaluminoxane, butylaluminoxane, hexylaluminoxane, octylaluminoxane, and decylaluminoxane.

In an embodiment of the present invention, the boron compound is disclosed in U.S. Pat. No. 5,198,401 and may be selected from the boron compounds represented by the following Formulas C to E.

$$B(R^e)_3 \quad [\text{Formula C}]$$

$$[R^f]^+[B(R^e)_4]^- \quad [\text{Formula D}]$$

$$[(R^g)_pZH]^+[B(R^e)_4]^- \quad [\text{Formula E}]$$

In Formulas C to E, B is a boron atom; $R^e$ is phenyl, which may be further substituted by 3 to 5 substituents selected from fluoro, C1-C10 alkyl substituted or unsubstituted by fluoro, and C1-C10 alkoxy substituted or unsubstituted by fluoro; $R^f$ is a C5-C7 aromatic or C5-C7 heteroaromatic radical, C7-C20 alkylaryl, or C7-C20 arylalkyl, for example, a triphenylmethyl radical; Z is a nitrogen atom or a phosphorus atom; $R^g$ is C1-C20 alkyl, or an anilinium radical substituted by two C1-C10 alkyls together with a nitrogen atom; and p is an integer of 2 or 3.

In an embodiment of the present invention, specific examples of the boron compound include tris(pentafluorophenyl)borane, tris(2,3,5,6-tetrafluorophenyl)borane, tris(2,3,4,5-tetrafluorophenyl)borane, tris(3,4,5-trifluorophenyl) borane, tris(2,3,4-trifluorophenyl)borane, phenylbis (pentafluorophenyl)borane, tetrakis(pentafluorophenyl) borate, tetrakis(2,3,5,6-tetrafluorophenyl)borate, tetrakis(2,3,4,5-tetrafluorophenyl) borate, tetrakis(3,4,5-tetrafluorophenyl)borate, tetrakis(2,2,4-trifluorophenyl) borate, phenylbis(pentafluorophenyl)borate, tetrakis(3,5-bistrifluoromethylphenyl)borate, ferrocenium tetrakis (pentafluorophenyl)borate, 1,1'-dimethylferrocenium tetrakis(pentafluorophenyl)borate, tetrakis(pentafluorophenyl)borate, triphenylmethyl tetrakis(pentafluorophenyl)borate, triphenylmethyl tetrakis(3,5-bistrifluoromethylphenyl) borate, trimethylammonium tetraphenylborate, triethylammonium tetraphenylborate, tripropylammonium tetraphenylborate, tributylammonium tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(n-butyl)ammonium tetrakis(3,5-bistrifluoromethylphenyl) borate, anilinium tetraphenylborate, anilinium tetrakis (pentafluorophenyl)borate, N,N-dimethylanilinium tetrakis (pentafluorophenyl)borate, N,N-diethylanilinium tetrakis (pentafluorophenyl)borate, N,N-2,4,6-pentamethylanilinium tetrakis(pentafluorophenyl)borate, N,N-dimethylanilinium tetrakis(3,5-bistrifluoromethylphenyl)borate, diisopropylammonium tetrakis(pentafluorophenyl)borate, dicyclohexylammonium tetrakis(pentafluorophenyl)borate, triphenylphosphonium tetrakis (pentafluorophenyl)borate, tri(methylphenyl)phosphonium tetrakis(pentafluorophenyl)borate, tri(dimethylphenyl)phosphonium tetrakis(pentafluorophenyl)borate, pyridinium tetraphenlyborate, and pyridinium tetrakis(pentafluorophenyl) borate, and the boron compound is preferably N,N-dimethylanilinium tetrakis(pentafluorophenyl)borate, triphenylmethyl tetrakis(pentafluorophenyl)borate, or tris (pentafluorophenyl)borane.

In the binuclear constrained geometry transition metal catalyst composition for preparing an ethylene-based elastic copolymer according to an embodiment of the present invention, the organoaluminum compound, the organoaluminoxane compound, or the boron compound, which is a cocatalyst, is not limited to the above example, and may be used alone or as a mixture at the time of polymerizing an ethylene-based elastic copolymer.

In an embodiment of the present invention, the amount of the binuclear constrained geometry transition metal compound which is a main catalyst, is not particularly limited, but a preferred range of a ratio of the main catalyst to the cocatalyst may be 1:0 to 200:1 to 2,000, more preferably 1:0.1 to 100:10 to 2,000, and more preferably 1:1 to 20:100 to 2,000, based on a molar ratio of transition metal Ti:boron atom:aluminum atom. The ethylene-based elastic copolymer may be prepared at the above ratio, and a range of the ratio may be changed depending on the amount of impurities contained in the reactant.

In an embodiment of the present invention, components of the binuclear constrained geometry transition metal compound which is a main catalyst and the cocatalyst may be separately added to a reactor or the respective components may be mixed in advance and then added to a reactor, and a mixing condition such as the addition order, temperature, or concentration is not particularly limited.

In an embodiment of the present invention, the α-olefin monomer is a linear or branched olefin-based monomer having 3 to 8 carbon atoms. As a specific example, the α-olefin monomer may be one or more selected from propylene, 1-butene, 1-pentene, 4-methyl-1-pentene, 1-hexene, 1-heptene, and 1-octene, and may be preferably propylene.

In an embodiment of the present invention, the diene monomer is a linear or branched, conjugated or non-conjugated diene monomer with two double bonds having 4 to 30 carbon atoms. As a specific example, the diene monomer may be one or more selected from the group consisting of 1,3-butadiene, 1,4-pentadiene, 1,4-hexadiene, 1,5-hexadiene, 1,5-heptadiene, 1,6-heptadiene, 1,6-octadiene, 1,7-octadiene, 1,7-nonadiene, 1,8-nonadiene, 1,8-decadiene, 1,9-decadiene, 1,12-tetradecadiene, 1,13-tetradecadiene, 2,3-dimethyl-1,3-butadiene, 3-methyl-1,4-hexadiene, 3-methyl-1,5-hexadiene, 3-ethyl-1,4-hexadiene, 3-ethyl-1,5-hexadiene, 3,3-dimethyl-1,4-hexadiene, 3,3-dimethyl-1,5-hexadiene, 5-vinyl-2-norbornene, 2,5-norbornadiene, 7-methyl-2,5-norbornadiene, 7-ethyl-2,5-norbornadiene, 7-propyl-2,5-norbornadiene, 7-butyl-2,5-norbornadiene, 7-phenyl-2,5-norbornadiene, 7-hexyl-2,5-norbornadiene, 7,7-dimethyl-2,5-norbornadiene, 7-methyl-7-ethyl-2,5-norbornadiene, 7-chloro-2,5-norbornadiene, 7-bromo-2,5-norbornadiene, 7-fluoro-2,5-norbornadiene, 7,7-dichloro-2,5-norbornadiene, 1-methyl-2,5-norbornadiene, 1-ethyl-2,5-norbornadiene, 1-propyl-2,5-norbornadiene, 1-butyl-2,5-norbornadiene, 1-chloro-2,5-norbornadiene, 1-bromo-2,5-norbornadiene, 5-isopropenyl-2-norbornene, 5-ethylidene-2-norbornene (ENB), 5-vinylidene-2-norbornene (VNB), 5-methylene-2-norbornene (MNB), and dicyclopentadiene.

In an embodiment of the present invention, an ethylene-based elastic copolymer may be prepared by polymerizing ethylene, an α-olefin monomer, and a C4-C30 diene monomer in the presence of the catalyst composition for preparing an ethylene-based elastic copolymer.

In an embodiment of the present invention, the polymerization may be performed in a slurry phase, a liquid phase, a gas phase, and a bulk phase. In a case where the polymerization is performed in a liquid or slurry phase, a solvent or an olefin-based monomer itself may be used as a medium. However, since the catalyst composition of the present invention is uniformly present in a polymerization reactor, the catalyst composition is preferably applied to a solution polymerization process performed at a temperature equal to or higher than a melting temperature of the corresponding polymer.

In an embodiment of the present invention, the polymerization may be performed by a batch, semi-continuous, or continuous reaction, and is preferably performed by a continuous reaction.

In an embodiment of the present invention, a preferred organic solvent that may be used in the preparation method is a hydrocarbon-based solvent. Specific examples of the hydrocarbon-based solvent may include an aliphatic hydrocarbon solvent having 4 to 20 carbon atoms such as isobutane, pentane, hexane, heptane, octane, isooctane, nonane, decane, dodecane, Isopar-E ($C_{8-12}$ aliphatic hydrocarbon solvent, manufactured by Exxon Chemical Co.), cyclopentane, methylcyclopentane, or cyclohexane, methylcyclohexane; an aromatic hydrocarbon solvent having 6 to 20 carbon atoms such as benzene, toluene, or xylene; a halogenated aliphatic hydrocarbon solvent having 1 to 20 carbon atoms such as dichloromethane, chloroethane, or 1,2-dichloroethane; a halogenated aromatic hydrocarbon solvent having 6 to 20 carbon atoms such as chlorobenzene, dichlorobenzene, or trichlorobenzene; and Isopar-E, but are not limited thereto, and any solvent used in various technical fields may be used. An aliphatic hydrocarbon solvent is preferably used in terms of improving a solubility of the binuclear constrained geometry transition metal compound which is a main catalyst, and the solvents are used alone or as a mixture of two or more thereof.

In an embodiment of the present invention, the polymerization may be performed by a reaction at a temperature of 50 to 200° C., preferably 80 to 180° C., more preferably 100 to 200° C., and under a pressure of 10 to 200 bar and preferably 50 to 150 bar, but the temperature and pressure conditions in the polymerization may be determined in consideration of an efficiency of the polymerization reaction depending on the types of reaction and reactor to be applied.

In general, in a case where the solution polymerization process is performed at a high temperature as described above, since a deformation or deterioration of the catalyst occurs due to an increase of the temperature, activity of the catalyst is decreased, such that it is difficult to obtain a polymer having desirable physical properties, but in a case where an ethylene-based elastic copolymer is prepared by the preparation method according to the present invention, the activity of the catalyst is stable at a high polymerization temperature.

In an embodiment of the present invention, an ethylene conversion may be 60 to 80% and preferably 62 to 76%, and an α-olefin conversion may be 40 to 50% and preferably 40 to 49.8%.

The ethylene-based elastic copolymer prepared by the preparation method of the present invention may have a molecular weight distribution (Mw/Mm) of 2.0 to 15, and may have a weight average molecular weight (Mw) of 5,000 or more and preferably 10,000 to 1,500,000 g/mol. In addition, hydrogen may be used as a chain transfer agent in order to adjust the molecular weight when the ethylene-based elastic copolymer is prepared.

In an embodiment of the present invention, the ethylene-based elastic copolymer is a copolymer of ethylene, α-olefin, and diene, and contains 20 wt % or more of ethylene.

In an embodiment of the present invention, the copolymer of ethylene, α-olefin, and diene contains 20 wt % or more of ethylene, 0.1 wt % or more of diene, and 10 wt % or more of α-olefin, and preferably 20 to 85 wt % of ethylene, 0.1 to 15 wt % of diene, and 10 to 70 wt % of α-olefin.

In an embodiment of the present invention, a content of propylene in the ethylene-based elastic copolymer may be 40 to 70 wt %.

An ethylene/propylene/diene (EPDM) elastomer may be prepared by using the preparation method according to an embodiment of the present invention in a highly efficient and cost-effective manner.

An ethylene-based elastic copolymer may be prepared by the method for preparing an ethylene-based elastic copolymer by using a binuclear constrained geometry transition metal catalyst composition for preparing an ethylene-based elastic copolymer according to an embodiment of the present invention, the binuclear constrained geometry transition metal catalyst composition comprising a binuclear constrained geometry transition metal compound represented by the following Formula 1; and one or more cocatalyst compounds selected from the group consisting of an organoaluminum compound, an organoaluminoxane compound, and a boron compound, in which the ethylene-based elastic copolymer is a copolymer of ethylene, α-olefin and C4-C30 diene, the α-olefin is propylene, a polymerization temperature is in a range of 100 to 200° C., an ethylene conversion is 60 to 80%, a propylene conversion is 40 to 50%, and a content of propylene in the ethylene-based elastic copolymer is 40 to 70 wt %.

An ethylene-based elastic copolymer may be prepared by the method for preparing an ethylene-based elastic copolymer by using a binuclear constrained geometry transition metal catalyst composition for preparing an ethylene-based elastic copolymer according to an embodiment of the present invention, the binuclear constrained geometry transition metal catalyst composition comprising a binuclear constrained geometry transition metal compound represented by the following Formula 1; and one or more cocatalyst compounds selected from the group consisting of an organoaluminum compound, an organoaluminoxane compound, and a boron compound, in which the ethylene-based elastic copolymer is a copolymer of ethylene, α-olefin and C4-C30 diene, the α-olefin is propylene, a polymerization temperature is in a range of 100 to 200° C., an ethylene conversion is 62 to 76%, a propylene conversion is 40 to 49.8%, and a content of propylene in the ethylene-based elastic copolymer is 46.9 to 70 wt %.

By using the method for preparing an ethylene-based elastic copolymer according to an embodiment of the present invention, a copolymer of ethylene, propylene, and C4-C30 diene in which a content of propylene in the copolymer is significantly increased depending on the addition amount of propylene which is α-olefin may be efficiently prepared.

Hereinafter, the present invention will be described in detail with reference to Examples and Comparative Examples, but the scope of the present invention is not limited by the following Examples.

Unless specified otherwise, all experiments for synthesizing the ligands and catalysts were carried out under a nitrogen atmosphere with a standard Schlenk or glove-box technique. All organic solvents used for the reaction were subjected to reflux in the presence of sodium metal and benzophenone to remove moisture, and distilled immediately before use. $^1$H-NMR analysis of the synthesized ligands and catalysts was carried out at room temperature using a Bruker 400 MHz.

n-Heptane, which is a polymerization solvent, was used by passing through a tube filled with molecular sieve 4 Å and activated alumina and being subjected to bubbling by high-purity nitrogen to sufficiently remove moisture, oxygen or other catalytic poisons. The synthesized polymer was analyzed by the methods described below.

1. Mooney Viscosity

A Mooney viscosity was measured at 125° C. in accordance with ASTM D 1646-04.

2. Weight Average Molecular Weight (Mw) and Molecular weight distribution (polydispersity index: PDI)

A weight average molecular weight was measured at 135° C. and a rate of 1.0 mL/min in the presence of a 1,2,3-trichlorobenzene solvent using PL210 GPC equipped with PL Mixed-BX2+preCol, and a molecular weight was calibrated by using a PL polystyrene standard material.

3. Melting Temperature (TM) Analysis

A melting temperature was measured under a $2^{nd}$ heating condition at a rate of 10° C./min under a nitrogen atmosphere by using DSC2910 manufactured by DuPont.

4. Analysis of Polymer Composition

A polymerization composition was measured in a $^{13}$C-NMR mode at 120° C. by using 1,2,4-trichlorobenzene/$C_6D_6$ (7/3 weight fraction) mixed solvent with DRX600 nuclear magnetic resonance spectroscopy (at 125 MHz) manufactured by Bruker (reference document: Randal, J. C. JMS-Rev. Macromol. Chem. Phys. 1980, C29, 201).

A ratio of ethylene and α-olefin and a content of diene in an EPDM polymer were quantified with an infrared spectrometer.

[Preparation Example 1] Preparation of Complex 1

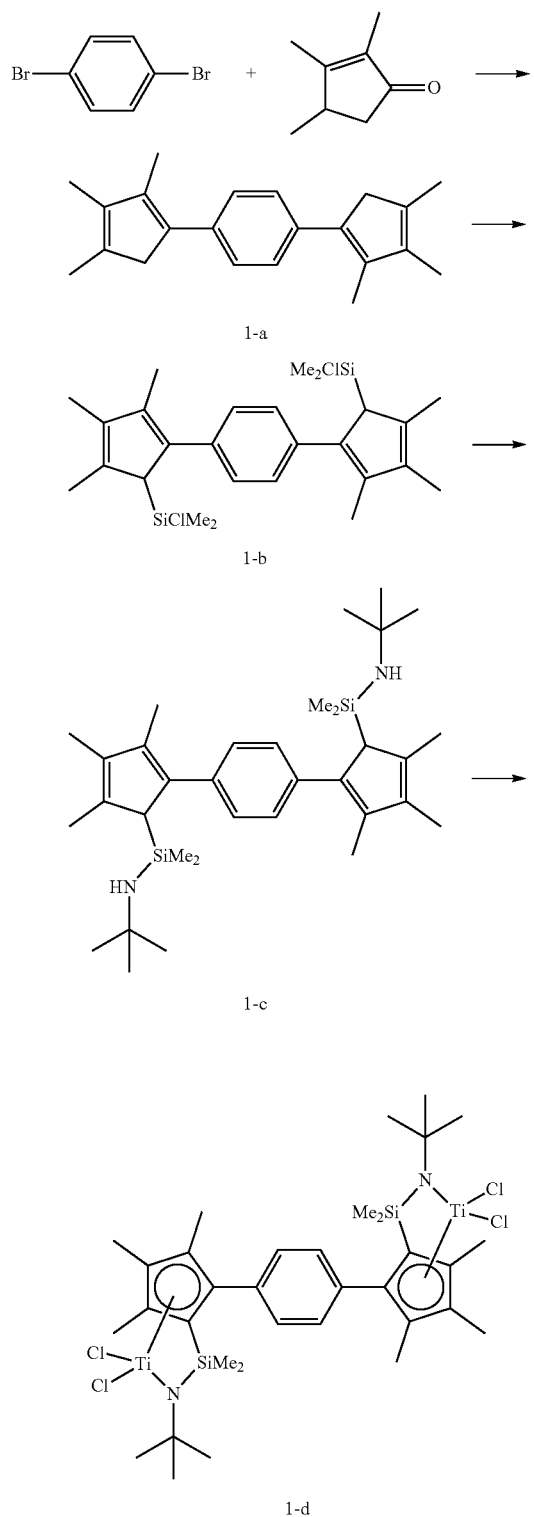

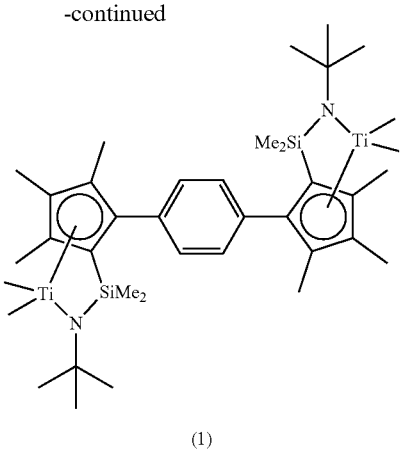

Preparation of 1,4-bis(trimethylcyclopentadienyl)benzene, Compound 1-a 1,4-Dibromobenzene (49 g) and diethyl ether (50 mL) were added to a 250 mL flask, n-BuLi (2.5 M in hexane solution) (83 mL) was slowly added dropwise thereto at 0° C., and then a reaction was carried out for 1 hour at room temperature. After cooling the flask containing the reaction solution to 0° C. again, a mixed solution of 2,3,4-trimethyl-2-cyclopenten-1-one (25.65 g) and diethyl ether (20 mL) was added to the cooled flask, stirring was performed for 10 minutes, and then a reflux was carried out. After carrying out the reflux for 1 hour, the flask was cooled to 0° C. again, n-BuLi (2.5 M in hexane solution) (83 mL) was added thereto, and then stirring was performed for hour at room temperature. After cooling the flask containing the reactant to 0° C. again, a mixed solution of 2,3,4-trimethylcyclopent-1-one (25.65 g) and diethyl ether (20 mL) was slowly added dropwise thereto. After the reaction was completed, the solution was vacuum-dried until the solution becomes sticky, an aqueous saturated ammonium chloride solution (200 mL) was added to the flask, and then stirring was performed for 10 minutes. An extraction was performed by using diethyl ether, and the extracted solvent was vacuum-dried until the amount of residual solvent is to be 200 mL. TsOH (6 g) was added to the flask, stirring was performed for 20 minutes, and then the reactant was dried again until the reactant is to be slurried. The thus-obtained reactant was washed with distilled water, ethanol, and methanol in this order, thereby obtaining 25 g of an ivory colored solid compound (1-a) (yield: 42%).

$^1$H NMR (400 MHz, CDCl$_3$, ppm): δ 7.32 (s, 4H), 3.18 (s, 4H), 2.09 (s, 6H), 1.99 (s, 6H), 1.86 (s, 6H).

Preparation of 1,4-bis(dimethylchlorosilyl trimethylcyclopentadienyl)benzene, Compound 1-b The compound (1-a) (15 g) and tetrahydrofuran (50 mL) were added to a 250 mL flask, the flask was cooled to −78° C., and then n-BuLi (2.5 M in hexane solution) (95 mL) was slowly added dropwise thereto. Stirring was performed at the same temperature for 40 minutes, and then stirring was performed at room temperature for 1 hour. After the reaction was carried out for 1 hour, the flask was cooled to −78° C. again, dimethlydichlorosilane (41 mL) was slowly added thereto, and then stirring was performed for 1 hour. After the stirring was performed for 1 hour, the flask was heated to room temperature, a reaction was carried out for 6 hours, and then the solvent of the reactant was removed by a vacuum method after the reaction was completed. The reactant from which the solvent was removed was extracted by using dichloromethane (100 mL), the extracted reactant was filtered with a celite filter, and then the filtered solution was vacuum-dried. The thus-obtained solid was vacuum-dried at 60° C. for 8 hours, thereby obtaining 22 g of an ivory colored and sticky solid compound (1-b) (yield: 90%).

$^1$H NMR (400 MHz, CDCl$_3$, ppm): δ 7.23 (s, 4H), 3.81 (s, 2H), 2.16 (s, 6H), 2.08 (d, 3H), 2.06 (d, 3H), 1.94 (s, 6H), −0.04 (s, 12H)

Preparation of 1,4-bis(tert-butylamino dimethylsilyl trimethylcyclopentadienyl)benzene, Compound 1-c The compound (1-b) (18 g) and tetrahydrofuran (100 mL) were added to a 250 mL flask, the flask was cooled to −78° C., and then t-butylamine (34 mL) was slowly added dropwise thereto. After a reaction was carried out for 6 hours or longer while increasing a reaction temperature to room temperature, vacuum-drying was performed at 60° C., the reactant was extracted by using diethyl ether, the extracted reactant was filtered with a celite filter, and then the filtered solution was vacuum-dried at 60° C., thereby obtaining 22 g of a yellow colored and sticky solid compound (1-c) (yield: 95%).

$^1$H NMR (400 MHz, CDCl$_3$, ppm): δ 7.20 (s, 4H), 3.59 (s, 2H), 2.08 (s, 6H), 2.03 (d, 3H), 2.01 (d, 3H), 1.89 (s, 6H), 0.96 (d, 18H), −0.12 (d, 6H), −0.29 (d, 6H)

Preparation of 1,4-bis(tert-butylamino dimethylsilyl trimethylcyclopentadienyl)benzene Ti dichloride, Compound 1-d The compound (1-c) (15 g) and tetrahydrofuran (50 mL) were added to a 250 mL flask, the flask was cooled to −78° C., and then n-BuLi (2.5 M in hexane solution) was slowly added dropwise thereto. After stirring was performed at the same temperature for 1 hour, the flask was heated to room temperature, and then stirring was further performed for 2 hours (Flask 1). TiCl$_3$(THF)$_3$ (19 g) and tetrahydrofuran (100 mL) were added to another 250 mL flask (Flask 2), the flask was cooled to −78° C., the lithiated compound [lithiated salt (Flask 1)] prepared in advance was transferred to the flask (Flask 2) using a cannula, and then a reaction was carried out for 6 hours or longer while the temperature was slowly increased to room temperature. After the reaction was completed, silver chloride (AgCl) (17 g) was added the flask and stirring was additionally performed for 1 hour, and then the solvent was removed by vacuum-drying. The reactant was extracted by using dichloromethane (100 mL), the extracted reactant was filtered with a celite filter, and the filtered solution was vacuum-dried, thereby obtaining 21 g of a deep rubiginous solid compound (1-d) (yield: 100%).

$^1$H NMR (400 MHz, CDCl$_3$, ppm): δ 7.62 (d, 4H), 2.29 (s, 6H), 2.24 (s, 6H), 2.14 (d, 6H), 1.37 (d, 18H), 0.65 (d, 6H), −0.10 (s, 6H).

Preparation of 1,4-bis(tert-butylamino dimethylsilyl trimethylcyclopentadienyl)benzene Ti dimethyl, Compound 1

The compound (1-d) (14 g) and tetrahydrofuran (100 mL) were added to a 250 mL flask, the flask was cooled to −78° C., and then a methyl lithium solution (3.0 M in diethyl ether solution) (49 mL) was slowly added dropwise thereto. After a reaction was carried out for 3 hours while increasing a reaction temperature to room temperature, vacuum-drying was performed at 60° C., the reactant was extracted by using n-hexane, the extracted reactant was filtered with a celite filter, and then the filtered solution was vacuum-dried at 60° C., thereby obtaining 8 g of a deep brown colored solid compound (1) (yield: 66%).

$^1$H NMR (400 MHz, C$_6$D$_6$, ppm): δ 7.28 (s, 2H), 7.24 (s, 2H), 2.04 (d, 6H), 1.99 (d, 6H), 1.95 (s, 6H), 1.55 (d, 18H), 0.81 (s, 6H), 0.71 (d, 6H), 0.43 (s, 6H), −0.10 (s, 6H).

Preparation of EPDM

[Example 1] Preparation of EPDM by Continuous Solution Polymerization Process

Ethylene, propylene, and 5-ethylidene-2-norbornene (ENB) were polymerized by using the compound (1) prepared in Preparation Example 1 as a main catalyst with a continuous polymerization apparatus, thereby preparing EPDM.

To a 1 L autoclave reactor, n-hexane (0.5 L), triisobutylaluminum (2.3 mmol), a dimethylanilinium tetrakis(pentafluorophenyl)borate cocatalyst solution (15 μmol), and 5-ethylidene-2-norbornene (ENB) were injected by a syringe. Propylene was added to the reactor at room temperature and was sufficiently pressurized to 8 bar. The reactor was heated to 80° C. and then ethylene was pressurized to 30 bar. Polymerization was performed by injecting and pressurizing the main catalyst compound (1) (1.5 μmol) with ethylene of 34 bar by a quantitative cylinder. Reaction heat generated after the polymerization is initiated was adjusted as much as possible by a reactor internal temperature maintaining apparatus and the maximum polymerization temperature of 110° C. to 120° C. was confirmed. 15 minutes after the polymerization was initiated, a polymer solution was discharged out through a lower portion of the reactor, and an excessive amount of ethanol was added to the reactor, thereby separating a polymer in a solid state. The thus-obtained polymer was dried by rolling at 120° C.

Examples 2 to 6

Polymerization was performed in the same manner as that of Example 1 except that addition amounts of ethylene and propylene were changed.

Comparative Example 1

Polymerization was performed in the same manner as that of Example 1 except that BPCGC-Me (1.5 μmol) having the following structure was used as a main catalyst.

Comparative Example 2

Polymerization was performed in the same manner as that of Example 1 except that CGC-Cl (3 μmol) having the following structure was used as a main catalyst.

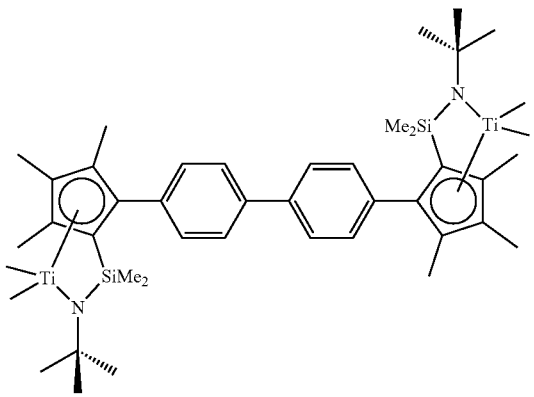

BPCGC-Me

-continued

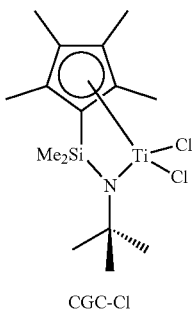

CGC-Cl

The polymerization conditions and the analysis results of copolymer physical properties of Examples 1 to 6 and Comparative Examples 1 and 2 are shown in Table 1.

In addition, it was confirmed that in the case where the compound 1 prepared in Preparation Example 1 was used as a main catalyst for preparing EPDM (Example 1), the polymerization activity was improved by about 2 times as compared to the catalyst of Comparative Example 1 in which a linking group that links two cyclopentadienes is biphenylene.

Accordingly, in a case where EPDM is prepared by using a binuclear constrained geometry transition metal compound, as a main catalyst, having a structure in which two cyclopentadienes are linked by 1,4-phenylene, the polymerization cost may be saved due to high polymerization activity.

In addition, in the method for preparing an ethylene-based elastic copolymer of the present invention, a binuclear

TABLE 1

|  |  | Example | | | | | | Comparative Example | |
|---|---|---|---|---|---|---|---|---|---|
|  |  | 1 | 2 | 3 | 4 | 5 | 6 | 1 | 2 |
| Polymerization condition | Polymerization pressure (bar) | 34 | 33 | 35 | 33 | 30 | 28 | 34 | 34 |
|  | Ethylene (g) | 85 | 100 | 96 | 89 | 76 | 63 | 85 | 85 |
|  | Propylene (g) | 115 | 43 | 64 | 90 | 120 | 180 | 115 | 115 |
|  | ENB (g) | 8.9 | 8.9 | 8.9 | 8.9 | 8.9 | 8.9 | 8.9 | 8.9 |
|  | Polymerization temperature (° C.) | 110 | 110 | 110 | 110 | 110 | 110 | 110 | 110 |
|  | Activity (g/gcat) | 114,000 | 81,000 | 101,000 | 95,000 | 116,000 | 112,000 | 62,000 | 109,000 |
| Polymer analysis | Mooney viscosity (ML 1 + 4 125° C.) | 71 | Non-measurable | Non-measurable | 57 | 38 | 17 | 86 | 31 |
|  | Weight average molecular weight (Mw × $10^3$) | 450 | 1,040 | 754 | 429 | 358 | 283 | 572 | 236 |
|  | Molecular weight distribution (MWD) | 3.7 | 2.6 | 2.3 | 3.8 | 4.3 | 2.5 | 3.7 | 3.8 |
|  | Ethylene (wt %) | 53.1 | 77.2 | 72.6 | 60.9 | 48.4 | 35.6 | 60.4 | 50.9 |
|  | Propylene (wt %) | 46.9 | 22.8 | 27.4 | 39.1 | 51.6 | 64.4 | 39.6 | 49.1 |
|  | ENB (wt %) | 2.2 | 2.5 | 2 | 2.1 | 2.65 | 1.9 | 2.6 | 2.9 |
| Monomer conversion | Ethylene conversion (%) | 62 | 62.5 | 76 | 65 | 74 | 63.3 | 49 | 48 |
|  | Propylene conversion (%) | 42 | 43 | 43 | 41.3 | 49.8 | 40 | 24 | 35 |
|  | ENB conversion (%) | 28 | 22.7 | 22.6 | 22.4 | 34.5 | 24 | 23 | 30 |

As the results of Table 1, it is confirmed that in the case where the compound 1 prepared in Preparation Example 1 was used as a main catalyst for preparing EPDM (Example 1), a molecular weight of EPDM was higher by about 2 times as compared to Comparative Example 2 in which CGC-Cl was used as a main catalyst, and a level of the polymerization activity in Example 1 was equal to or higher than that in Comparative Example 2.

constrained geometry transition metal compound having a structure in which two cyclopentadienes are linked by 1,4-phenylene is used as a polymerization catalyst, such that the maximum amount of propylene mixed in the ethylene-based elastic copolymer of ethylene, propylene, and C4-C30 diene may be easily adjusted to about 70 wt % due to an excellent reactivity with propylene, and it is possible to prepare a copolymer of ethylene, propylene, and C4-C30 diene in which a content of propylene in the copolymer is significantly increased depending on the addition amount of propylene.

In addition, the method for preparing an ethylene-based elastic copolymer of the present invention implements a comonomer conversion higher than that in Comparative Examples 1 and 2 and a high reaction efficiency due to the high comonomer conversion, the amount of unreacted propylene is decreased due to the high propylene conversion, and a recycle amount in the process is decreased, which results in a cost-effectiveness.

In addition, in the method for preparing an ethylene-based elastic copolymer of the present invention, the binuclear constrained geometry transition metal compound having a structure in which two cyclopentadienes are linked by 1,4-phenylene is used as a main catalyst, such that it is possible to expect to improve mechanical physical properties of EPDM, such as a tensile strength, a tear strength, and a heat resistance as compared to a case of using a conventional catalyst, and also to perform high filling, which is advantageous in terms of a cost-effectiveness.

Further, the binuclear constrained geometry transition metal compound used as a main catalyst in the preparation method of the present invention, that is, a catalyst having a structure in which two cyclopentadienes are linked by 1,4-phenylene, has an excellent solubility to an aliphatic hydrocarbon solvent, such that a uniform concentration of the catalyst may be maintained during a polymerization reaction and the catalyst may be easily added. Therefore, a stable polymerization activity may be expected.

The present invention has been described in detail with reference to examples as set forth above, but those skilled in the art to which the invention pertains can implement various modifications without departing from the spirit and scope of the present invention defined in appended claims. Therefore, alterations of the examples of the present invention would not depart from the technique of the present invention.

The invention claimed is:

1. A method for preparing an ethylene-based elastic copolymer in the presence of a catalyst composition comprising a binuclear constrained geometry transition metal compound represented by Formula 1 and one or more cocatalyst compounds selected from the group consisting of an organoaluminum compound, an organoaluminoxane compound, and a boron compound,
    wherein the ethylene-based elastic copolymer is a copolymer of ethylene, propylene, and C4-C30 diene,
    a polymerization temperature is in a range of 100 to 200° C.,
    an ethylene conversion is 60 to 80%,
    a propylene conversion is 40 to 50%, and
    a content of the propylene in the ethylene-based elastic copolymer is 40 to 70 wt %

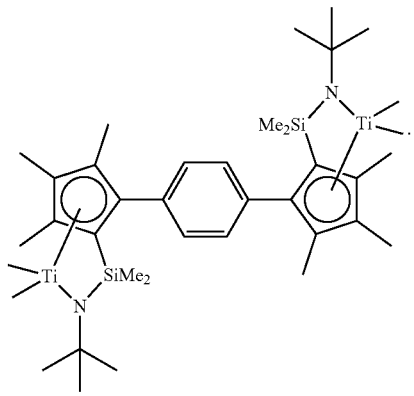

[Formula 1]

2. The method of claim 1, wherein
the diene is one or more selected from the group consisting of 1,3-butadiene, 1,4-pentadiene, 1,4-hexadiene, 1,5-hexadiene, 1,5-heptadiene, 1,6-heptadiene, 1,6-octadiene, 1,7-octadiene, 1,7-nonadiene, 1,8-nonadiene, 1,8-decadiene, 1,9-decadiene, 1,12-tetradecadiene, 1,13-tetradecadiene, 2,3-dimethyl-1,3-butadiene, 3-methyl-1,4-hexadiene, 3-methyl-1,5-hexadiene, 3-ethyl-1,4-hexadiene, 3-ethyl-1,5-hexadiene, 3,3-dimethyl-1,4-hexadiene, 3,3-dimethyl-1,5-hexadiene, 5-vinyl-2-norbornene, 2,5-norbornadiene, 7-methyl-2,5-norbornadiene, 7-ethyl-2,5-norbornadiene, 7-propyl-2,5-norbornadiene, 7-butyl-2,5-norbornadiene, 7-phenyl-2,5-norbornadiene, 7-hexyl-2,5-norbornadiene, 7,7-dimethyl-2,5-norbornadiene, 7-methyl-7-ethyl-2,5-norbornadiene, 7-chloro-2,5-norbornadiene, 7-bromo-2,5-norbornadiene, 7-fluoro-2,5-norbornadiene, 7,7-dichloro-2,5-norbornadiene, 1-methyl-2,5-norbornadiene, 1-ethyl-2,5-norbornadiene, 1-propyl-2,5-norbornadiene, 1-butyl-2,5-norbornadiene, 1-chloro-2,5-norbornadiene, 1-bromo-2,5-norbornadiene, 5-isopropenyl-2-norbornene, 5-ethylidene-2-norbornene (ENB), 5-vinylidene-2-norbornene (VNB), 5-methylene-2-norbornene (MNB), and dicyclopentadiene.

3. The method of claim 1, wherein
a polymerization pressure is in a range of 10 to 200 bar.

4. The method of claim 1, wherein
a weight average molecular weight of the ethylene-based elastic copolymer is in a range of 10,000 to 1,500,000 g/mol, and a molecular weight distribution of the ethylene-based elastic copolymer is in a range of 2.0 to 15.

5. The method of claim 1, wherein
a content of the ethylene in the ethylene-based elastic copolymer is 20 to 85 wt %, and a content of the diene in the ethylene-based elastic copolymer is 0.1 to 15 wt %.

* * * * *